UNITED STATES PATENT OFFICE.

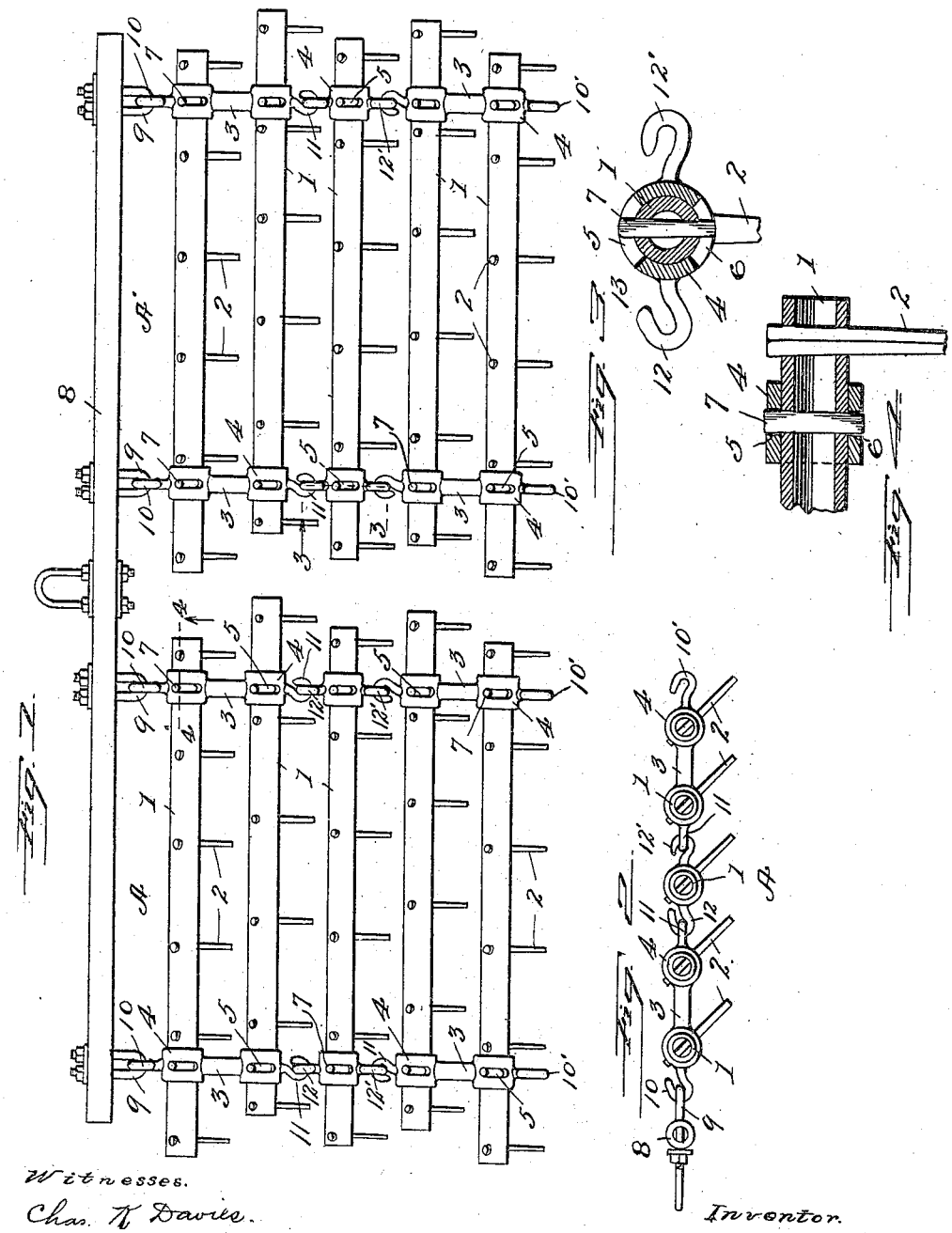

AUGUST FRIEDEMANN, OF WAVERLY, IOWA.

HARROW.

No. 838,974.  Specification of Letters Patent.  Patented Dec. 18, 1906.

Application filed May 24, 1906. Serial No. 318,451.

*To all whom it may concern:*

Be it known that I, AUGUST FRIEDEMANN, a citizen of the United States, and a resident of Waverly, in the county of Bremer and State of Iowa, have invented a new and useful Improvement in Harrows, of which the following is a specification.

The object of the invention is the provision of an implement of this class which shall be comparatively cheap in first cost and inexpensive to repair whenever necessary, which shall be manufactured of merchantable metal, such as gas-pipe and malleable iron, in the desired shapes, thus providing a simple, strong, and durable structure.

A further object is the provision of a flexible harrow which will readily adjust itself to the unevenness of the ground over which it travels, and finally I provide a harrow made up of sections, by means of which sections the size of the implement may be increased or diminished to suit the circumstances of the work.

The invention consists in certain novel features of construction and combinations and arrangements of parts, as described in the specification, more clearly pointed out in the claims, and as illustrated in the accompanying drawings.

In the drawings I have illustrated and herein describe one example of the practical application of the principles of the invention, the implement being shown as constructed according to the preferred embodiment of the invention.

Figure 1 is a top plan view of a harrow embodying my improved construction. Fig. 2 is an end view of Fig. 1. Fig. 3 is an enlarged view, partly in longitudinal section, of the draft-bar and hooks of an intermediate section of the harrow. Fig. 4 is a detail view, enlarged, on line 4 4, Fig. 1.

The harrow is constructed throughout of metal, the drag or tooth bars 1 being composed of metallic tubes, such as gas-pipe of merchantable form, and these tubes are perforated for the reception of the tapered teeth 2, which are forced into and through the perforations with a wedge action to insure a rigid and stable fit.

As will be observed from the drawings, the bars 1 are connected by the cross-bars 3, and preferably the bars 1 are made up into sections, three sections being illustrated in the drawings, Fig. 1. As shown, the forward section is composed of two drag-bars 1, connected by cross-bar 3 at each end. The rear section is similarly constructed, and these two sections are joined by the intermediate section, which latter section comprises one drag or tooth bar 1.

To insure flexibility of parts when the harrow is traveling over the ground, I connect the drag-bars and cross-bars or frame-bars with a loose or swinging joint and also provide a flexible connection between the forward, intermediate, and rear sections of each harrow-section. The flexible joint between the cross-bars and drag-bars of the forward and rear sections is secured by providing a sleeve 4, fashioned near each end of the cross-bars 3. Before the teeth are fitted to the tubes or bars 1 these tubes are passed through the sleeves 4 of the bars 3. The upper and lower face of each of the sleeves 4 is cut out to form a pair of complementary slots 5 and 6, and the tubes or drag-bars 1 are perforated in line with these slots. Through these perforations a pin or bar 7 is passed and secured in manner similar to the attachment of the teeth 2, the ends of the pin 7 projecting upwardly and downwardly through the upper and lower slots 5 and 6 in the sleeves. The tooth-bar 1 is thus permitted to have a rocking movement within the limits of the slots 5 and 6, but is held against lateral movement by the pin in the slots. These slots are of a size to permit a swinging or rocking movement of the bars 1 through an angle of ninety degrees in order that the teeth may stand in normal position at an incline of forty-five degrees in either direction, depending upon the direction of the travel of the harrow. The drag-bar of the intermediate section is similarly jointed by slots and pins.

The two harrow-sections A A' are attached to the draft-bar or evener 8 by means of the clevises 9 on the draft-bar, into which are looped the integral hooks 10, formed at the outer ends of the cross-bars. The inner ends of the bars 3 of the forward and rear sections are each formed with an eye 11, and through these eyes 11 the hooks 12 12', formed on the ends of the intermediate cross-bars 13, are caught, the connection being loose and of a nature to permit independent movement of the three sections, in order that they may adapt themselves to the inequality of the ground as the harrow travels.

If it is desired to reverse the travel of the harrow from the position shown in Fig. 1, the draft-bar may be quickly and readily detached from the front of the implement and attached at the rear thereof by means of the hooks 10' on the rear sections, and a pull on the draft-bar will cause the drag-bars to rock on the lines of teeth and swing over, so that the teeth 2 may stand inclined at an angle of forty-five degrees in a direction opposite to the former inclination.

As shown in the drawings, the harrow-sections A A' are built up of three distinct sections, the forward and rear sections containing two drag or tooth bars each and the intermediate section having one tooth-bar, and the three sections are flexibly jointed by hooking the eyes of the cross-bar of the intermediate section over the hooks on the adjoining inner ends of the cross-bars of the outer sections. It is evident that the harrow-sections may be made up in a variety of forms and the drag-bar sections assembled in increased or diminished number by substituting a two-bar section for the one-bar section, and so on, as desired. By constructing the harrow-sections A A' of a greater number of drag-bar sections within limits better work may be secured.

In the above-described construction I dispense with the use of bolts, nuts, screws, &c., and hold the drag-bars in place by means of the pins passed through the slots in the sleeves of the cross-bars, thereby allowing to each tooth-bar the required rocking or swinging motion necessary when reversing the travel of the harrow and permitting the harrow to adjust itself to the nature of the ground over which it is traveling.

From the above description, taken in connection with the drawings, it is obvious that I have provided an implement which fulfils the conditions set forth as the object of the invention. The embodiment of the invention without the use of securing devices, as bolts, screws, nuts, &c., reduces the cost of manufacture and permits the assembling of the parts with facility and despatch. The parts of the harrow may be dismantled and separated and packed for shipping with ease and convenience.

What I claim is—

1. In a harrow the combination of a draft-bar, and one or more main harrow-sections connected to the draft-bar, each of such sections comprising two outside sections each consisting of two metallic toothed bars connected together by two rigid metallic draft-bars, and an intermediate section consisting of a single metallic toothed bar to which the outer sections are flexibly connected.

2. In a harrow, the combination of a draft-bar and one or more main harrow-sections each adapted to be readily connected and disconnected to the draft-bar at either end by means of hook-and-eye couplings; each of said main sections consisting of two outside sections each comprising two tubular metal bars having a plurality of inserted teeth, two rigid metal cross-bars each having an eye near each end encircling one of said toothed bars and each of said cross-bars having a hook at its inner end; and an intermediate section consisting of a single toothed bar connected flexibly to the other sections by means of a metallic sleeve near each end thereof, each of said sleeves being provided with hooks engaging the hooks of the said outside sections.

3. In a harrow, a draft-bar provided with four eyelets, two main harrow-sections each having two hooks at each end adapted to be quickly engaged and disengaged with two of the eyelets on said draft-bar; each of said harrow-sections comprising an outer section consisting of two rigid metallic cross-bars formed with a sleeve near each end; two tubular metallic toothed bars each loosely mounted in the cross-bars by passing through corresponding sleeves in the opposite bars; pins in the toothed bars lying in slots provided in said sleeves so as to permit the toothed bars to move in the sleeves so that the teeth of said bars may lie angularly toward the rear in relation to the cross-bars in either direction of movement of the harrow; another outer section similarly composed, and an intermediate section consisting of a single toothed bar, two metallic sleeves in which said bar is loosely mounted, pins in said bar engaging slots provided in the sleeves so as to permit similar motion of the bar in relation to the sleeves; the outside sections being connected flexibly together by means of hooks on the inner ends of their cross-bars engaging corresponding hooks provided on the sleeves of said intermediate section.

In testimony whereof I have affixed my signature in the presence of two witnesses.

AUGUST FRIEDEMANN.

Witnesses:
   F. E. FARWELL,
   F. P. HAGEMANN.